United States Patent [19]

Yeomans

[11] Patent Number: 5,592,932
[45] Date of Patent: Jan. 14, 1997

[54] RADIANT ENERGY COLLECTING APPARATUS

[76] Inventor: Allan J. Yeomans, 60 Sunrise Boulevard, Surfers Paradise, Gold Coast City, QLD 4217, Australia

[21] Appl. No.: 302,276

[22] Filed: Sep. 8, 1994

[51] Int. Cl.$^6$ ........................................................ F24J 2/02
[52] U.S. Cl. .......................... 126/686; 126/694; 126/600; 126/684
[58] Field of Search ................................. 126/600, 648, 126/650, 686, 685, 687, 692, 693, 694, 695, 681

[56] References Cited

U.S. PATENT DOCUMENTS

| | | | |
|---|---|---|---|
| 2,994,318 | 8/1961 | Lee | 126/681 |
| 3,985,119 | 10/1976 | Oakes, Jr. | 126/600 |
| 4,084,576 | 4/1978 | Pei | 126/694 |
| 4,134,392 | 1/1979 | Livermore et al. | 126/685 |
| 4,149,521 | 4/1979 | Miller et al. | 126/648 |
| 4,220,136 | 9/1980 | Penny | 126/600 |
| 4,228,789 | 10/1980 | Kay . | |
| 4,281,640 | 8/1981 | Wells . | |
| 4,546,757 | 10/1985 | Jakahi | 126/694 |
| 5,309,893 | 5/1994 | Yeomans | 126/600 |

*Primary Examiner*—Carl D. Price
*Attorney, Agent, or Firm*—Wood, Phillips, VanSanten, Clark & Mortimer

[57] ABSTRACT

A radiant energy collecting apparatus for collecting and concentrating solar energy having a primary parabolic reflector which focuses the sun's rays on a focal line and has a principal axis passing through the focal line and a secondary concentrating assembly located adjacent the focal line of the primary reflector. The secondary concentrating assembly, includes a pair of planar reflectors arranged on opposite sides of the principle axis of the primary reflector and a series of secondary parabolic reflectors between the planar reflectors, the secondary parabolic reflectors having focal lines which extend normal to the planar reflectors and to the principal axis of the primary reflector. The secondary reflectors are mounted for rotation about their focal lines and concentrate energy on targets extending along their focal lines.

24 Claims, 7 Drawing Sheets

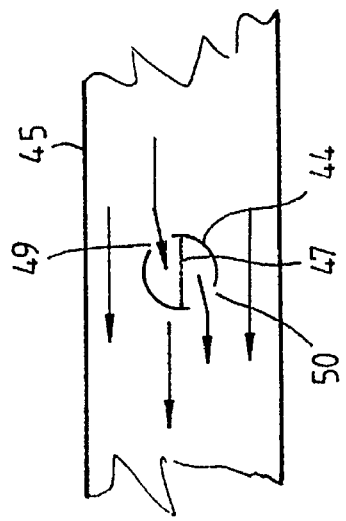
FIG. 7
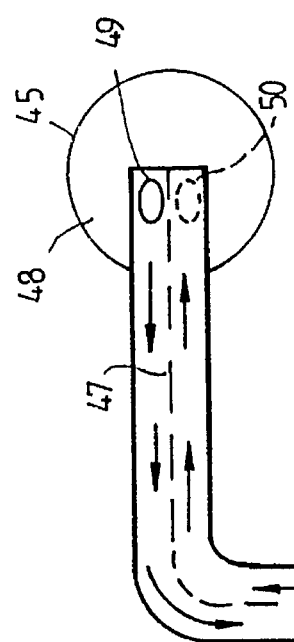
FIG. 6
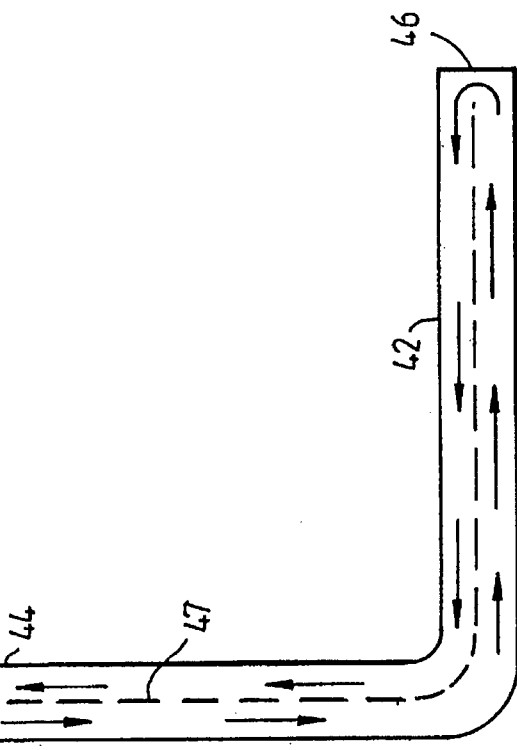

1

RADIANT ENERGY COLLECTING APPARATUS

BACKGROUND OF THE INVENTION

1. Field of the Invention

This invention relates to improvements to radiant energy collecting apparatus and in particular to an improved solar energy concentrating apparatus.

2. Background Art

Solar collectors are often built in a manner to achieve high temperatures in the energy collecting medium. Concentration of solar energy has been achieved in the past using parabolic concentrating mirrors. Cylindrical parabolic concentrators are commonly used as they are inexpensive, however, such concentrators cannot achieve high concentration ratios. High concentration ratios can, however, be easily achieved by the use of spherical, parabolic concentrating mirrors, however such mirrors are excessively expensive for solar heating applications.

To achieve high concentration ratios with a cylindrical parabolic mirror system having primary cylindrical parabolic concentrators, an additional secondary series of cylindrical parabolic mirrors can be placed at right angles to the focus line of the primary mirrors and placed at the point of focus of the primary mirrors. The secondary mirrors concentrate the energy on collecting pipes carrying a heat absorption medium. Such an arrangement is shown in U.S. Pat. No. 4,281,640 to WELLS.

With the sun at any position, other than directly at right angles to the focus line of the primary mirrors, that is directly overhead, however, the secondary parabolic mirrors cannot be placed so that more than a small proportion of the reflecting surface of the secondary mirrors will be at the focus line distance from the primary mirrors.

It is thus necessary to extend the length of the individual secondary mirrors to trap the wider area of sunlight from the primary mirrors as large areas of the secondary mirrors will be out of focus with the light from the primary mirrors. Additionally the length of the collecting pipe associated with the secondary mirrors is required to be increased.

Maximum concentration ratios available from the primary mirrors cannot be utilized by the secondary mirrors and this significantly reduces the total maximum concentration ratio from this configuration. In addition the longer length of the individual secondary mirrors substantially increases their cost. Furthermore, increased heat loss occurs from the longer length collecting pipes.

In the construction of solar energy concentrators the heat collecting and conveying medium is usually conveyed through a system of pipes. The heat collecting section of pipe on which the solar energy is concentrated is by necessity at high temperatures and is particularly prone to re-radiated heat losses. To minimize such heat losses the heat collecting pipe is often enclosed within a glass tube and the space between the inner collecting pipe and the glass tube is maintained at a high vacuum. The maintenance of this vacuum to minimize heat losses is generally essential and often difficult to achieve and maintain. The cooler outer glass tubing and the high temperature of the heat collecting pipe create uneven longitudinal heat expansion variations rendering the outer tubing vulnerable to shattering.

It is an object of the present invention to overcome or substantially ameliorate one or more of the above-described disadvantages and to enhance the usefulness of such systems in the field.

SUMMARY OF THE INVENTION

According to one aspect of the present invention, a radiant energy collecting assembly is provided having a primary collecting reflector assembly of cylindrical parabolic form which concentrates energy on a focal line. A pair of planar elongated parallel side reflectors are provided extending parallel to the plane of the principal axis of the primary collecting reflector assembly and arranged to be equidistant to and on either side of the principal axis of the primary collecting reflectors. The parallel reflectors are so placed that their edges proximate to the primary reflector assembly are substantially at or adjacent the focus line of the primary reflector assembly so that the maximum concentration of rays is thence forth maintained within the parallel reflectors. The aforesaid edges of the parallel side reflectors are linear and lie in a common plane.

The elongated planar reflectors are spaced a distance apart so as to entrap the sun rays concentrated by the primary reflector assembly at its line of focus and to entrap additional sun rays, not exactly focused at the focal line due to slight errors in the form of the primary reflector assembly and also to permit the use of flat Fresnel mirrors in the primary reflector assembly.

Secondary concentrating cylindrical parabolic reflectors are mounted between the longitudinal planar reflectors to form a secondary concentrating assembly. The secondary concentrating reflectors have such a length that there is only a small clearance between the opposite ends of the secondary parabolic reflector and the inside surface of each longitudinal planar reflectors. The plane of the principal axes of the secondary parabolic reflectors are substantially at right angles to the plane of the principal axes of the primary reflector assembly.

The secondary parabolic concentrating reflectors are arranged so as to be rotatable about their own individual focus lines. The focus line of each secondary reflector is the line about which the secondary reflector may be rotated to permit the plane of the principal axis of the secondary reflector to be always parallel to the sun's rays emanating from the primary reflector assembly. The common plane containing the edges of the side reflectors is parallel or substantially parallel to the focus lines of the secondary parabolic reflectors.

Suitably, the reflective surfaces of the secondary reflectors do not extend beyond or substantially beyond the latus rectum of the parabolic shape of the secondary reflector. That is the secondary reflectors do not extend beyond or substantially beyond a plane passing through the focus line and extending at right angles to the principal axis of the reflectors.

Preferably, the focus line of the secondary reflectors is placed a distance back from the proximate edge of the parallel planar reflectors and in consequence a distance back from the focus line of the primary reflector assembly such that when the secondary reflectors are caused to rotate about their own individual focus line, at the point where the secondary reflectors extend beyond the proximate edges of the parallel longitudinal reflectors, the angle made by a tangent to the parabolic curve of the secondary reflector and the edge of the longitudinal planar reflectors and being the angle which at this point includes the focus line of the secondary reflector, will not substantially decrease below an angle of ninety degrees during use.

In a preferred aspect of the present invention, the secondary reflectors and planar side reflectors are supported on a main frame and a support member having an arcuate track therein is rigidly attached to the rear of each secondary parabolic reflector. The track is formed to be at all times equidistant from the focus line of the secondary reflectors by being centered on the focus line and to be at all times located behind the reflecting surfaces of the secondary reflectors. Guides are attached to the main frame supporting the parallel reflectors so as to engage the track and to constrain the secondary reflectors to at all times maintain a substantially constant focus line. The secondary reflectors are preferably interconnected through a linkage assembly connected to the support members, movement of which will adjust the pivotal position of all the secondary reflectors between one pair of side reflectors to maintain the principal axes of the secondary reflectors aligned with the sun's rays reflected from the primary reflector assembly.

Extending along the focus line of each secondary reflector is an energy collecting element in the form of a tube which carries a heat absorbent medium, such as an oil which is heated by the rays concentrated by the secondary reflectors. The elements are preferably of tubular form and may be coated or provided with a black outer finish for maximum energy absorption. The elements are preferably connected to a common manifold through which the heat absorbent medium flows.

The primary reflector assembly is preferably comprised of a plurality of planar thin mirrors which extend parallel to each other and which are angled to concentrate solar energy on a focus line whose width is determined by the width of each mirror.

The parabolic secondary reflectors may include any suitable reflecting surface such as a mirror surface or a highly polished metal and may be also a series of mirrors in a Fresnel configuration.

The radiant energy collecting assembly is arranged to track movement of the sun for example by either rotation about a vertical or a horizontal axis. For this purpose, the plane of the principal axes of the primary reflectors is moved so as to always contain the sun. Thus if the collector assembly is mounted for movement about a horizontal axis, the assembly is pivoted about that axis to maintain the aforesaid plane in a position in which it contains the sun as it moves from East to West. Alternatively, where the assembly is mounted for rotational movement about a vertical axis, the assembly is rotated to maintain the sun in the plane of the principal axes of the primary reflectors. In an alternative configuration, the reflective elements which make up the primary reflector may individually track the sun to maintain a focus at a fixed line adjacent the secondary concentrating assembly which maintains a fixed position.

BRIEF DESCRIPTION OF THE DRAWINGS

FIG. 6 is an enlarged view of the energy collecting element and manifold associated with the secondary reflector assembly;

FIG. 7 is a sectioned side view showing the junction between the energy collecting element and its associated ducting and manifold;

DETAILED DESCRIPTION OF THE PREFERRED EMBODIMENT

Figure 1:
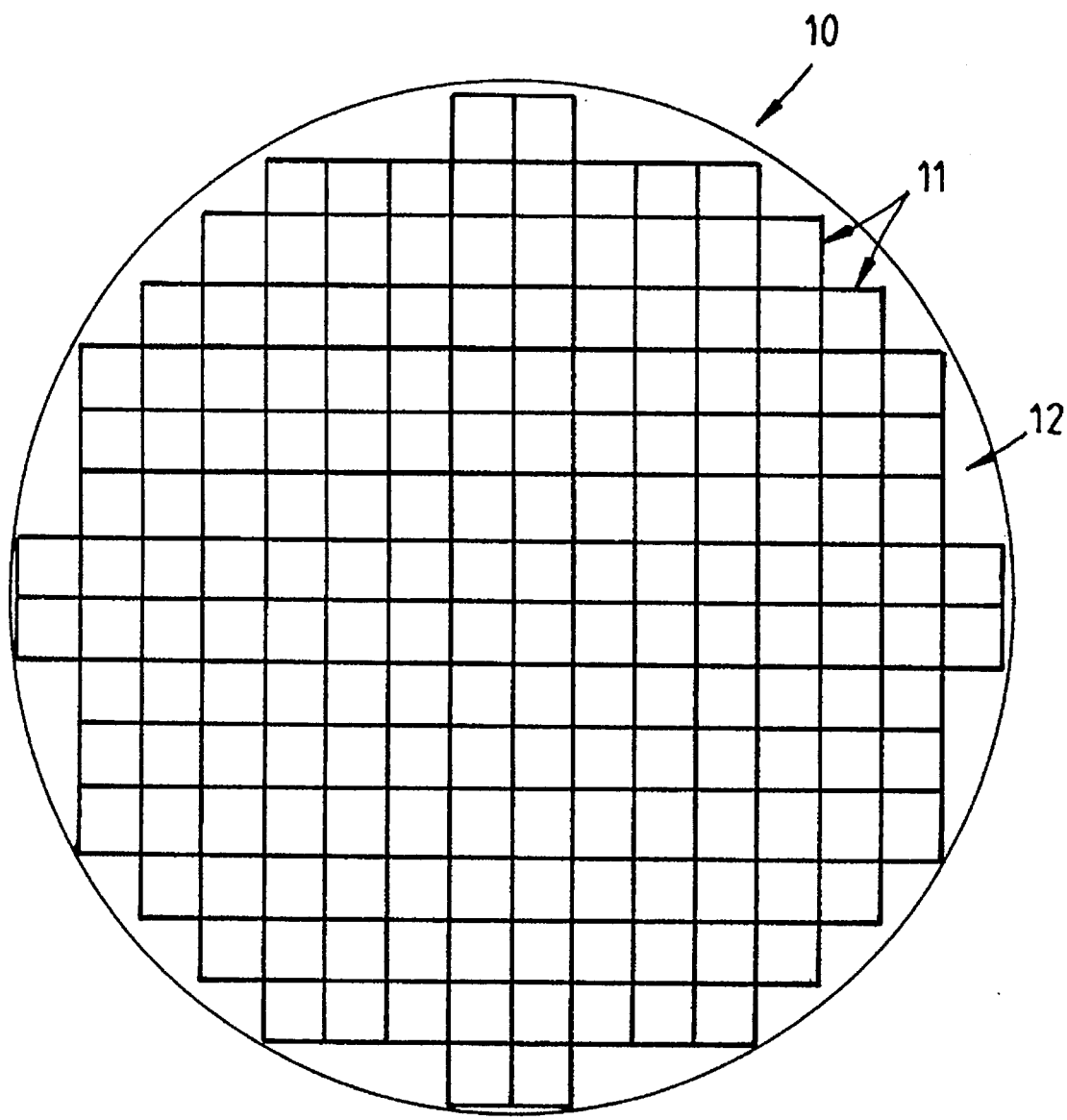
FIG. 1 is a plan view showing the layout of an array of solar collector assemblies according to the present invention.

Referring to the drawings and firstly to FIG. 1 there is illustrated an array 10 of radiant energy, suitably solar, concentrating assemblies 11 according to the present invention arranged on, or defining a platform assembly 12. The platform assembly 12 is in one embodiment formed of a buoyant material and is arranged for flotation on a body of water which acts as a bearing so that the platform assembly 12 may be rotated about a vertical axis to track movement of the sun. Such an arrangement is described in my U.S. Pat. No. 5,309,893, issued May 10, 1994, the contents of which are incorporated herein by reference. Actuating means are provided to cause rotation of the platform assembly 12 about a vertical axis to track movement of the sun, the actuating means being actuated in response to any suitable sun tracking means. In an alternative configuration, the array of solar assemblies 11 may be fixed and reflectors in the assembly may be moved so as to track the sun for example as shown in the above mentioned U.S. Pat. No. 4,281,640. Of course the array 10 of the solar assemblies may comprise any number of concentrating assemblies 11 to suit the particular application requirements of the array.

Figure 2:
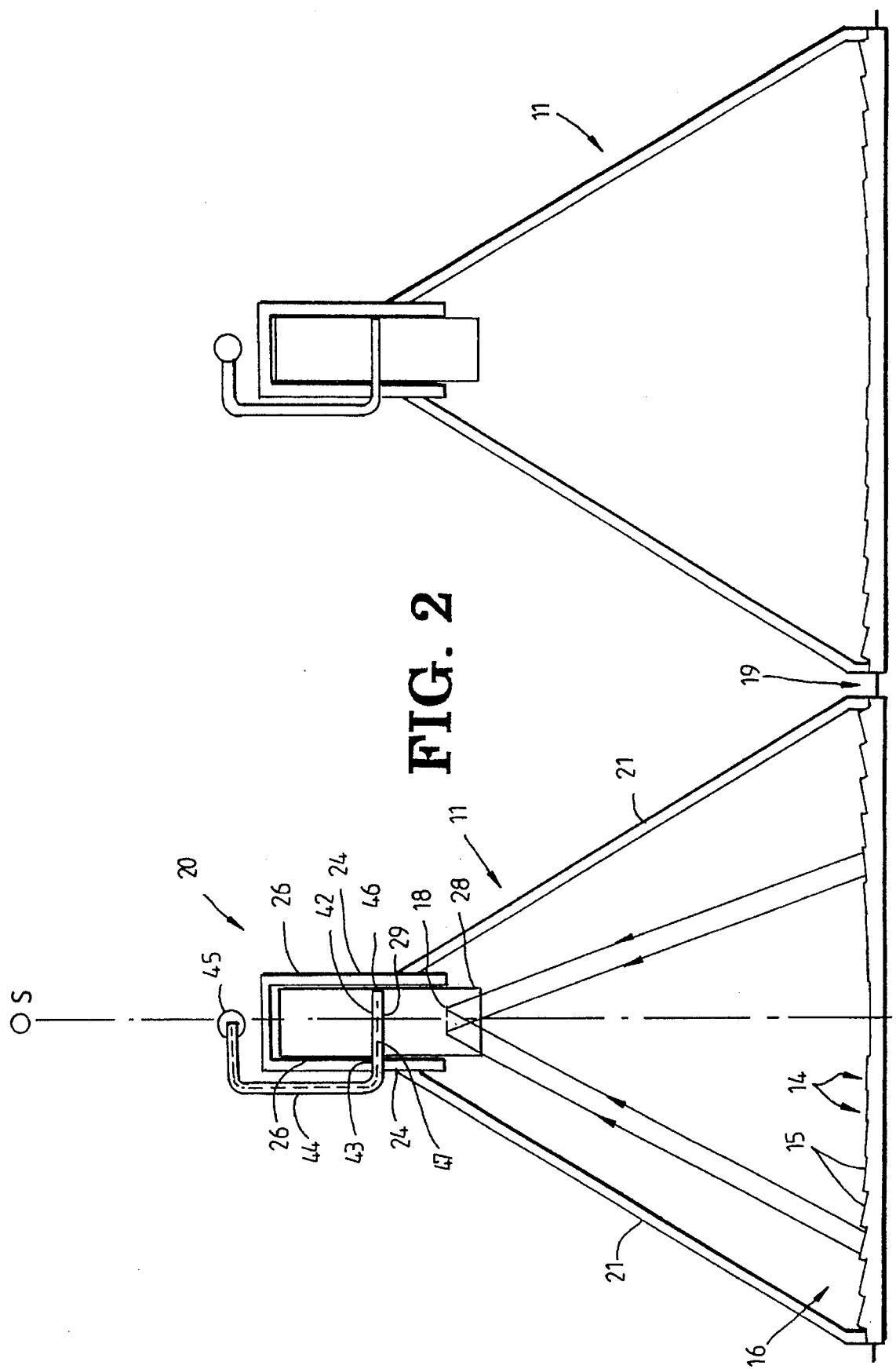
FIG. 2 is an end view showing a pair of side by side solar collector assemblies.
Figure 3:
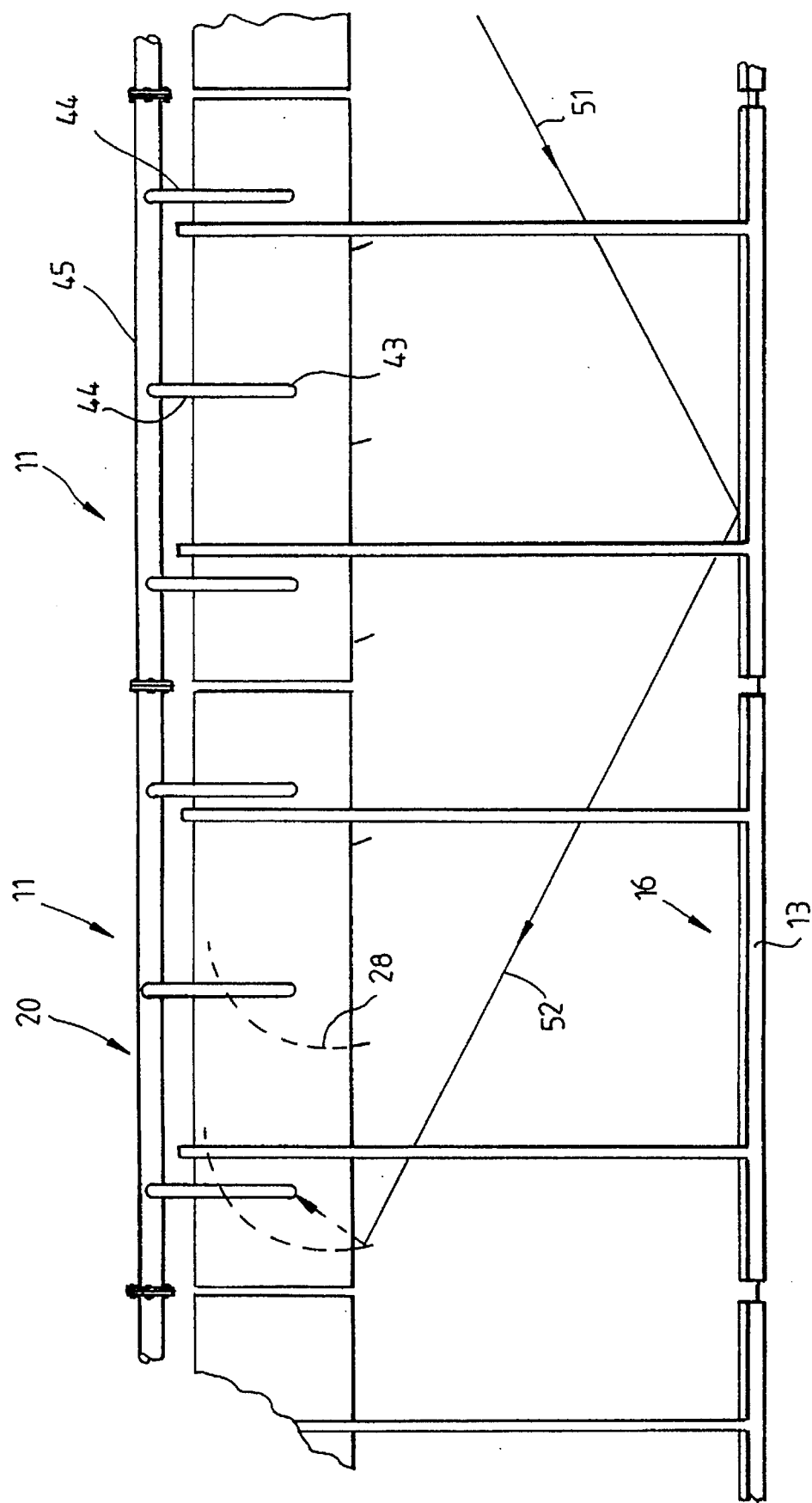
FIG. 3 is a side elevational view showing a plurality of solar collector assemblies in end to end relationship.
Figure 8:
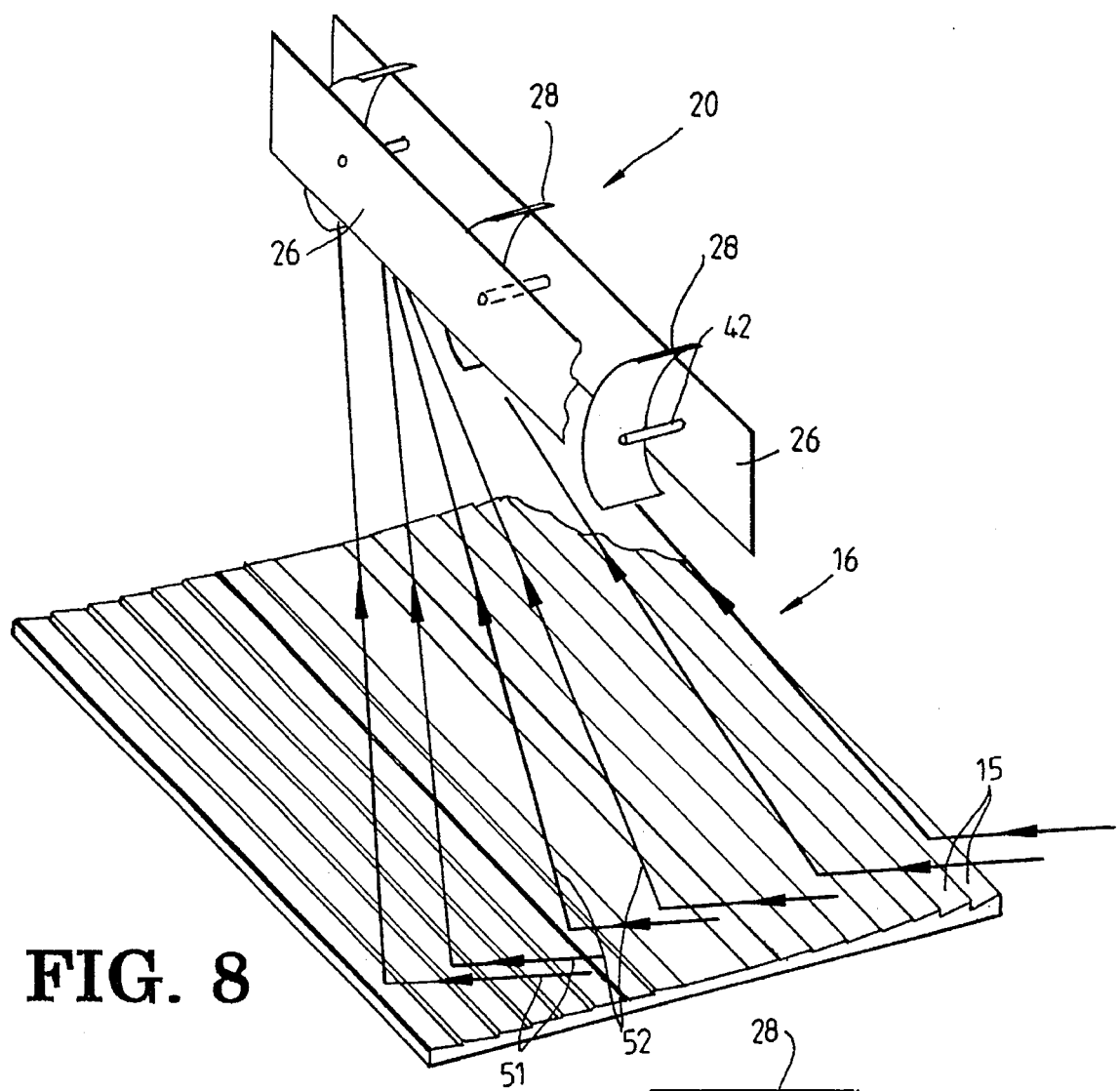
FIG. 8 is a perspective view showing the general arrangement of a solar collector assembly of the type shown in FIGS. 2 to 5.

Each solar concentrating assembly 11 as shown more clearly in FIGS. 2, 3 and 8 includes a square base 13 which in the "floating" embodiment is formed of a buoyant material such as foamed plastics material. The base 13 is provided with or includes on or in its upper side, a plurality of angled planar surfaces 14 which define mounts for elongated strip reflectors 15 which are supported thereon, the surfaces 14 being arranged at an increasing inclination to the horizontal outwardly from the center along parabolic curves and on opposite sides of the base 13 so that the reflectors 15 form a composite primary reflector 16 having substantially cylindrical parabolic reflector properties and having a principal axis or axes 17. Intersection of light rays from the reflectors 15 occurs at a linear focus or focus line 18. (The focus 18 extends linearly, though it may have a width and thus is not necessarily precisely defined as a "line", such as illustrated in FIG. 2.). The reflectors 15 suitably are in the form of glass or plastic strip mirrors, however, they may also be of any other highly reflective material. Each base 13 is connected to the adjacent base 13 at its opposite ends and sides through connection elements or assemblies 19 which permits when the bases 13 are floating on water a degree of relative movement pivotally and horizontally between the bases 13 of adjacent assemblies 11.

Figure 4:
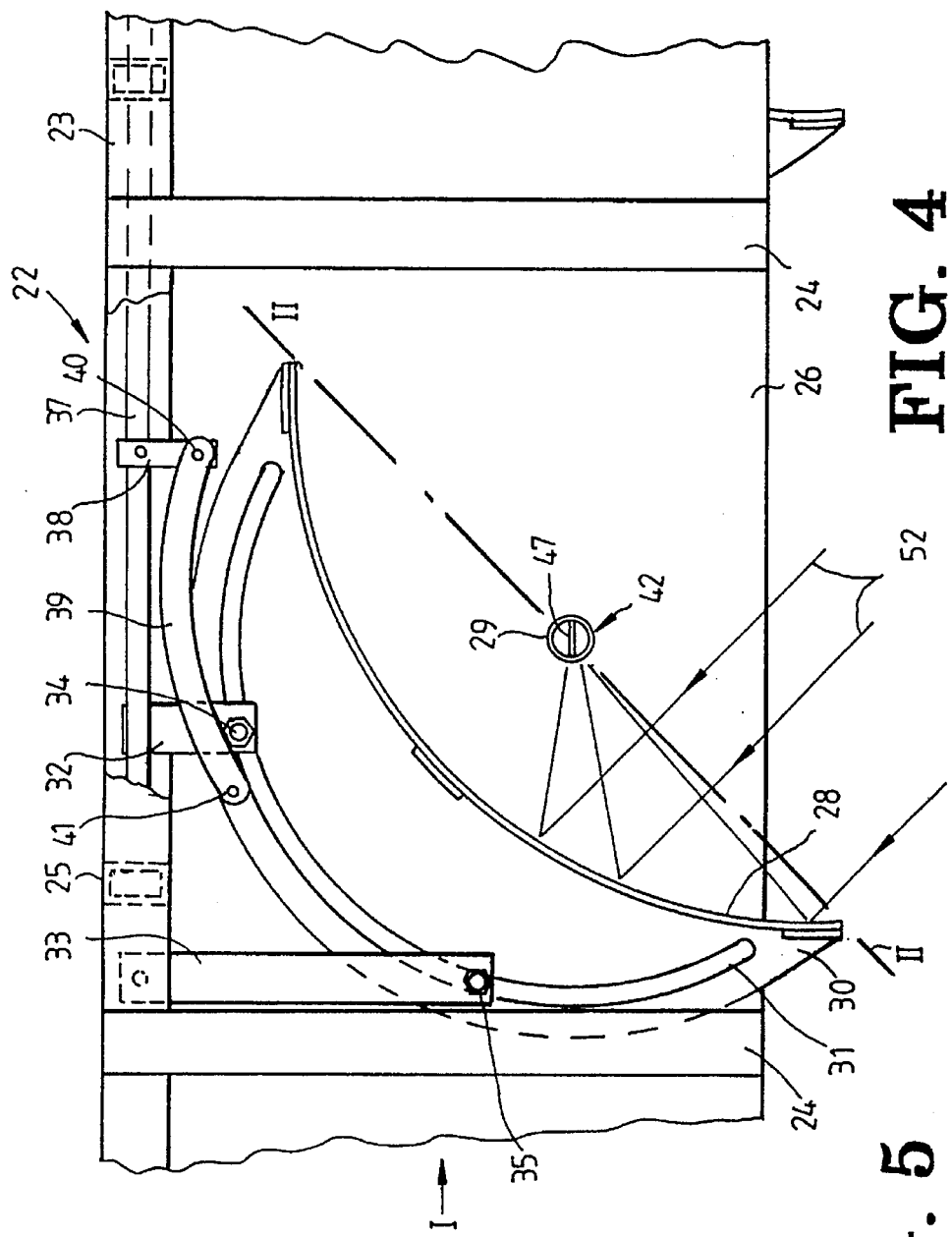
FIG. 4 illustrates in side view, with one side mirror removed, portion of a secondary reflector assembly and adjusting mechanism therefore.
Figure 5:
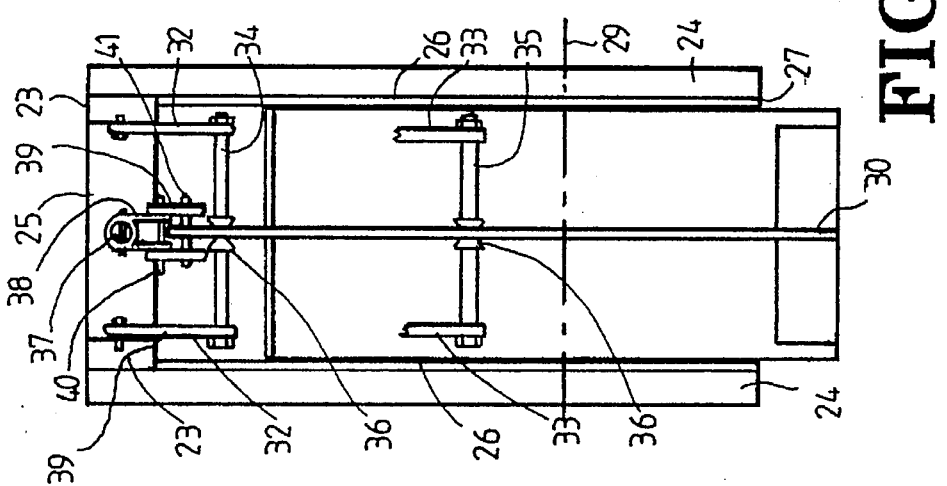
FIG. 5 is an end view in the direction I of FIG. 4 of the secondary reflector assembly of FIG. 4.

The reflectors 15 are arranged to concentrate solar energy onto or towards a secondary concentrating assembly 20 supported above the base 13 by means of pairs of opposite downwardly and outwardly inclined struts 21 which are mounted at their lower ends to the base 13. Each secondary concentrating assembly 20 as shown in FIGS. 4 and 5 includes a rectangular frame 22 having spaced apart longitudinally extending upper frame members 23 which extend parallel to the reflectors 15 and which support depending side frame members 24 and which are spaced apart by top transversely extending frame members 25. The frame members of the frame 22 are advantageously constructed of light weight material such as aluminum and interconnected by welding to form the assembled frame 22. Mounted to the side frame members 24 are a pair of opposite spaced apart planar reflectors 26 which have their reflective surfaces facing and extending parallel to each other and which are arranged to be equidistant to, and on either side of the principal axis 17 or plane containing the principal axes of the primary reflector 16. The reflectors 26 are so placed that their lowest edges 27, that is their edges proximate to the primary reflector 16 are substantially at or aligned with the focus line 18 of the primary reflector 16. The edges 27 which are linear extend parallel to each other and lie in a common plane.

Arranged between the planar reflectors 26 are a series of secondary concentrating cylindrical parabolic reflectors 28 which have their focus lines 29 extending substantially normal to the planar reflectors 26 and the principal axis 17 of the primary reflector 16. The latus rectum of the parabola defined by the parabolic reflector 28 is indicated by the line II, this line passing through the focus line 29 of the reflector 28 as shown in FIG. 4 and extending at right angles to the principal axis of the reflector 28. The reflectors 28 are configured so that they do not extend beyond or substantially beyond the latus rectum II. A reflector 28 of this form provides optimum concentration coupled with minimum multiple reflections from the planar reflectors 26. The plane containing the edges 27 of the reflectors 26 is parallel to the focus lines 29 of the parabolic reflectors 28.

The reflectors 28 are supported for limited rotation about an axis of rotation extending along their focus lines 29. For this purpose and as more clearly shown in FIGS. 4 and 5 the reflectors 28 are provided on the rear side with a crescent shaped plate 30 arranged centrally widthwise of the reflectors 28 and fixed to the back face thereof by adhesives or any other suitable fixing arrangement. The plate 30 is provided with an arcuate slot 31 centered on the focus line 29 and thus the required axis of rotation of the reflector 28. Two pairs of spaced apart brackets 32 and 33 are secured to the opposite frame members 23 and support therebetween respective axles 34 and 35 which in this embodiment are in the form of bolts. The axles 34 and 35 extend through the slot 31 and carry centering rollers 36 which engage with the opposite side edges of the slot 31. The plate 30 is thus supported at two spaced apart positions for rotational movement about the focus line 29 and thus the parabolic reflector 28 is similarly supported.

Adjustment of the rotational position of the reflectors 28 is achieved by means of a common adjustment member 37 which is located between the frame members 23 and extends longitudinally thereof and through aligned guide apertures in the spaced transverse frame members 25. The adjustment member 37 carries and is fixed to a series of lugs 38 adjacent each parabolic reflector 28. A pair of adjusting links 39 are pivotally connected to each lug 38 and the plate 30 through pivot pins 40 and 41 at opposite ends thereof. Thus longitudinal movement of the adjustment member 37 in opposite directions will cause opposite longitudinal movement of the lugs 38 which will be translated through the links 39 to opposite rotational movement of each plate 30 and thus each reflector 28 about the focus line 29.

Extending along the focus line 29 of each reflector 28 is an energy collecting element 42 in the form of a tubular pipe which passes through an opening in one of the side reflectors 26 as at 43 and is connected via a connecting duct 44 to a manifold assembly 45 extending longitudinally relative to the frame 22. The element 42 as shown more clearly in FIG. 6 is closed at one end 46 and is provided with a central diametrically extending divider 47 which extends along the element 42 but which terminates short of the closed end 46. The divider 47 also extends along the full length of the connecting duct 44 to the opposite end 48 thereof. The end 48 of the duct 44 also extends partway into the manifold 45. The element 42 and duct 44 which may be integrally formed are of generally U-shaped configuration. The end 48 on opposite sides of the divider 47 has inlet and outlet openings 49 and 50 which open to opposite sides of the manifold 45 relative to the direction of flow of an energy transfer medium therealong. Thus that medium when flowing along the manifold assembly 45 will pass into the inlet opening 49 on one side of the duct 44 to pass to the element 42, reverse direction at the end 46 of the element 42 and flow outwardly along the other side of the divider 47 through the connecting duct 44 and out of the outlet 50 into the manifold assembly 45. The energy transfer medium suitably comprises oil or other fluid so that heat energy can be collected and carried by the manifold assembly 45 to a suitable storage or use location.

Figure 9:
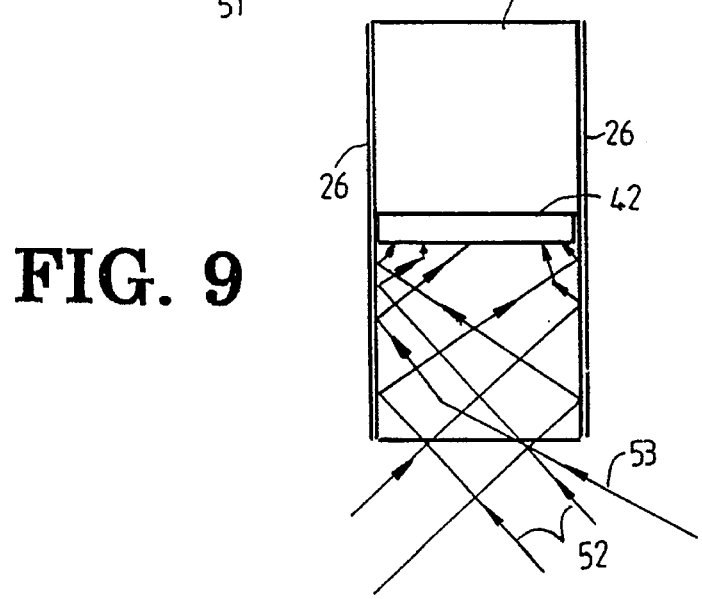
FIG. 9 illustrates the manner in which the secondary reflector traps the radiant energy reflected and converted by the primary reflector assembly from the sun.
Figure 11:
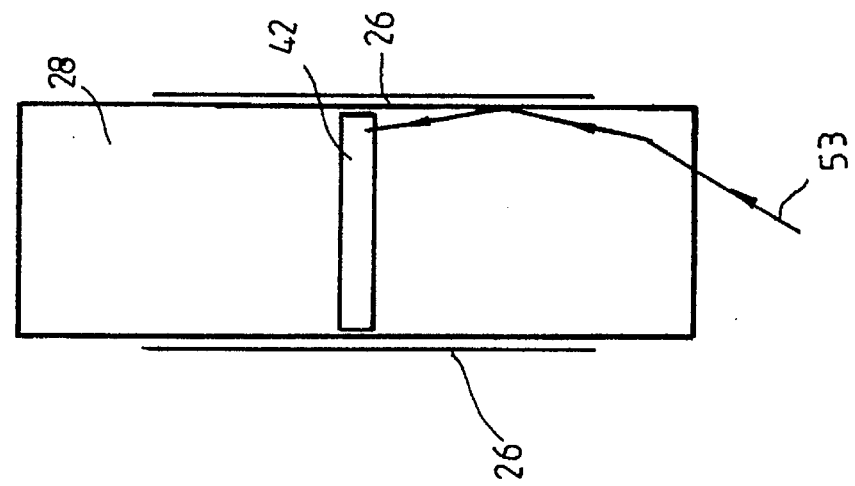
FIGS. 10 and 11 illustrate schematically in side and end view the secondary reflector concentrating assembly.

Operation of the solar collection assembly 11 of the invention will now be described with reference to FIGS. 2, 3, 4 and 6 to 11. The sun during the day moves through a path from East to West with increasing altitude from sunrise at the horizon to noon and decreasing altitude from noon to sunset. The altitude angle also varies according to the season of the year. Thus, in summer the maximum altitude angle at noon is substantially greater than the corresponding altitude angle in winter. The array of solar assemblies 11 are arranged so that the planes containing the principal axes 17 of the reflectors 16 contain the sun shown as S in FIG. 2 and maintain this relationship with the sun by rotating as the sun moves from sunrise to sunset. Such an arrangement is described in my aforesaid U.S. Pat. No. 5,309,893. The incident angle of the sun's rays on the reflectors 15 varies in accordance with the time of day and with the season. Thus, the incoming sun's rays, indicated as 51 are incident on the primary reflectors 15 and are reflected as at 52 towards the secondary concentrating assembly 20. The adjustment member 37 is moved longitudinally to adjust the rotation position of the parabolic reflectors 28 so that their principal axes are substantially parallel to the reflected rays 49 from the primary reflectors 15. Rays striking the central region of the reflector assembly 16 are reflected directly to the parabolic reflectors 28 where they are concentrated on the element 42 as is apparent in FIGS. 3 and 4. Rays striking the reflector assembly 16 outwardly of the center of the assembly 16 will because of the parabolic configuration of the reflector assembly 16 be directed inwardly towards the secondary concentrating assembly 20, the rays crossing at the focus line 18. Some rays will as shown in FIGS. 9 and 11 and indicated as 53 strike the parabolic reflector 28 and be directed onto the side reflector 26 and be concentrated on the element 42. Other rays will strike the opposite side reflectors 26 to be reflected onto the parabolic reflector 28 which concentrates the rays on the element 42. Other rays may be reflected from opposite side reflectors 26 before being concentrated on the element 42 by the parabolic reflector 28. Thus substantially all of the reflected rays 52 and 53 will be captured between the planar reflectors 26 and directed to the parabolic reflectors 28 so as to be concentrated on the element 42.

Figure 10:
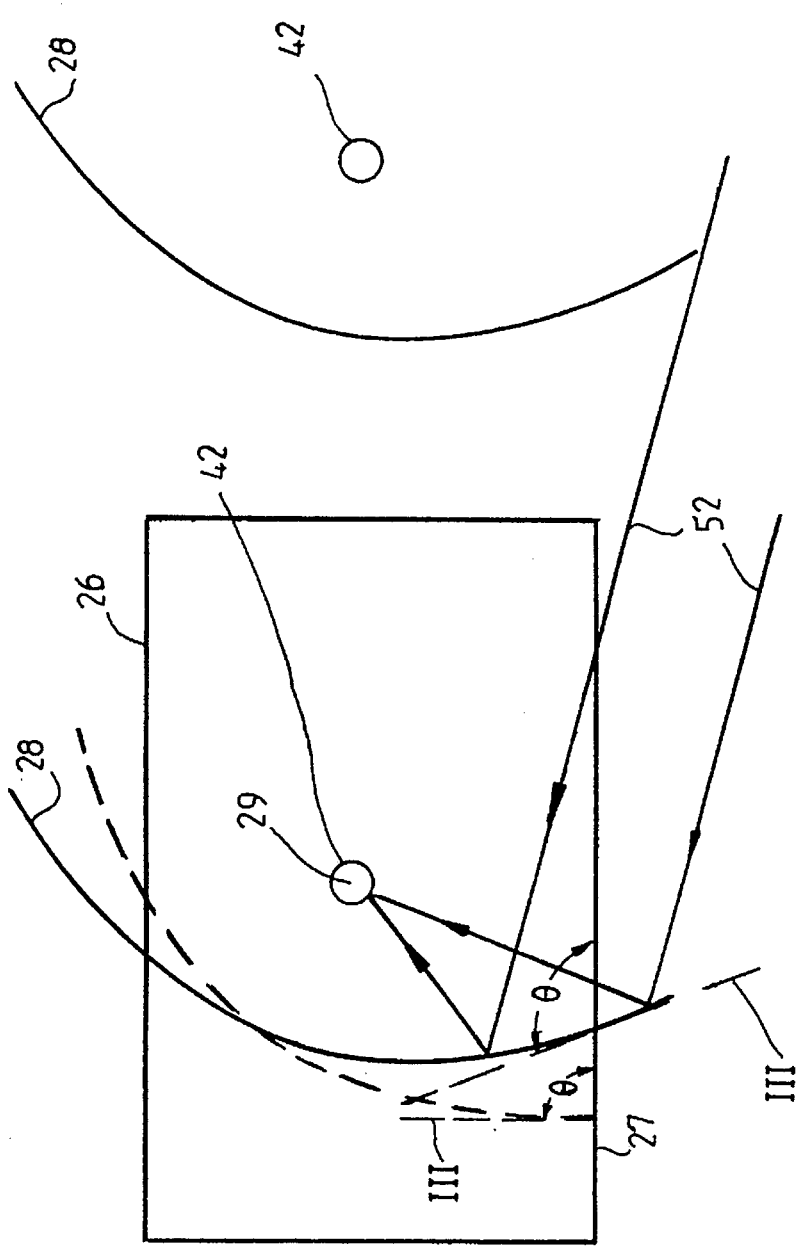

As shown in FIG. 10, the tangent line indicated at III to the parabolic reflector 28 at the point of intersection with the lower edge 27 of the planar mirror 26 forms an angle θ with that lower edge, the angle θ containing the focus line 29 of the secondary reflector 28. For maximum efficiency of collection of reflected energy, this angle should not decrease below 90 degrees. In the arrangement illustrated in FIG. 10, the angle θ is somewhat larger than 90 degrees. As the reflector 28 is pivoted clockwise towards the position shown in dotted outline in FIG. 10, the angle θ approaches 90 degrees. When, however, this angle is at 90 degrees, as shown in FIG. 10 or less than 90 degrees the lower edge of the reflector 28 passes above the lower edge 27 of the reflectors 27. If the configuration of the reflector 28 relative to the side reflectors 26 is such that the angle θ in the position, say of FIG. 10 is less than 90 degrees, reflected rays 49 striking the parabolic mirror 28 below the edge 27 will be reflected past the side mirrors 26 and thus not be concentrated onto the element 42.

The element 42 as stated above contains an energy transfer medium such as an oil which will be heated by the rays concentrated on the element 42. As stated above the energy transfer medium is passed along the manifold assembly 45 thus being achieved by means, for example of a pump. At least portion of this flow will pass into the duct 44 through the inlet 49 on one side of the divider 47 for passage to the element 42 to flow back to the manifold assembly 45 on the opposite side of the divider 47 through the outlet 50. During its passage along the element 42 on opposite sides of the divider 47 the oil is heated and thus passes as heated oil back to the manifold assembly 45. The oil may thus be conveyed for conversion into useable energy for example for steam generation purposes for driving a turbine. Such arrangements are well known in the art.

The present invention thus provides a system where radiant energy from the sun may be collected and concentrated in a highly efficient manner for extraction of energy. The planar side mirrors or reflectors 26 ensure that maximum energy from the sun is trapped and thereafter concentrated on the element 42 for conversion into useful energy. The secondary concentrating assembly used in the application illustrated and described may of course be employed with other primary reflector assemblies.

Additionally, many variations may be made to the configuration of the apparatus without departing from the inventive concept. Thus the parabolic secondary reflectors 28 may be supported for rotation about their focus lines in any manner and each may be adjusted individually if desired. The primary reflector 16 of course may be in the form of a parabolic trough or other similar configuration.

Whilst the preferred manner of extraction of the concentrated energy is by a fluid type medium flowing in the element 42, the element 42 may be replaced by an alternative target which can receive the concentrated radiant energy and/or convert the received energy into a suitable form for subsequent use.

I claim:

1. A radiant energy collecting apparatus comprising:
 a primary substantially parabolic concentrating assembly having a principal axis and a substantially linear focus;
 a secondary concentrating assembly arranged adjacent said linear focus to receive energy from said primary concentrating assembly, said secondary concentrating assembly including:
 a pair of substantially parallel spaced apart planar reflectors fixed relative to said primary concentrating assembly so as to face each other on opposite sides of said principal axis, said reflectors having substantially linear edges proximate to the primary concentrating assembly in substantial alignment with said linear focus; and
 substantially parabolic secondary concentrators arranged between said planar reflectors, said secondary concentrators having focus lines and being mounted for rotational movement about their said focus lines relative to said planar reflectors.

2. The apparatus of claim 1 wherein said planar reflectors comprise elongated reflector members, said reflector members being arranged equidistantly on opposite sides of said principal axis.

3. The apparatus of claim 2 wherein the focus lines of said secondary concentrators are oriented substantially normal to said principal axis of said primary concentrating assembly.

4. The apparatus of claim 3 wherein said parabolic reflectors extend substantially between said planar reflectors.

5. The apparatus of claim 3 wherein said parabolic reflectors do not extend substantially beyond their latus rectum.

6. The apparatus of claim 1 wherein said primary concentrating assembly includes a plurality of elongated reflecting elements angled relative to each other to form a composite parabolic concentrator to concentrate energy on said linear focus.

7. The apparatus of claim 1 wherein said secondary concentrators comprise Fresnel mirrors.

8. The radiant energy collecting apparatus of claim 6, wherein said proximate edges of said planar reflectors are substantially parallel to said elongated reflecting elements.

9. A solar energy collecting apparatus including a primary concentrating assembly having a principal axis and a linear focus at a selected level, said apparatus further comprising a secondary concentrating assembly for receiving energy concentrated by said primary concentrating assembly, said secondary concentrating assembly comprising:
 a pair of spaced apart substantially parallel planar reflectors arranged on opposite sides of said principal axis and being fixed relative to said primary concentrating assembly, said reflectors facing each other and being substantially parallel to the plane containing said principal axis, edges of said reflectors located proximate the primary concentrating assembly being substantially linear and arranged parallel to and at substantially an equal distance from the primary concentrating assembly as the linear focus of said primary concentrating assembly,
 a plurality of parabolic secondary reflectors located at spaced apart longitudinal positions between said planar reflectors, said parabolic reflectors having focus lines and being mounted for rotational movement about their said focus lines, and
 means at said focus lines relative to said plane reflectors of said secondary reflectors for receiving solar energy concentrated by said secondary reflectors.

10. The apparatus of claim 9 wherein said solar energy receiving means comprises tubular members adapted to contain an energy absorbent fluid.

11. The apparatus of claim 10 wherein said tubular members are closed at one end and include central dividers extending therealong and terminating short of said one end whereby said fluid may flow in opposite directions on opposite sides of said dividers.

12. The apparatus of claim 11 wherein said tubular members are connected to a common fluid flow manifold to receive fluid therefrom and direct fluid thereto.

13. The apparatus of claim 9 wherein said parabolic secondary reflectors have focal lines extending substantially normal to said planar reflectors and to said principal axis of said primary concentrating assembly.

14. The apparatus of claim 13 wherein said reflectors do not extend substantially beyond the latus rectum of their parabolic curves.

15. The apparatus of claim 13, further comprising means for simultaneously adjusting the rotational positions of said parabolic reflectors.

16. The apparatus of claim 9 wherein said parabolic secondary reflectors have reflective surfaces which extend substantially between said planar reflectors.

17. The apparatus of claim 13 wherein the tangent of each said parabolic reflector at the point of intersection between said parabolic reflector and said planar reflector proximate edge forms an angle with said proximate edge containing said focus line of said reflector which does not fall substantially below ninety degrees.

18. The apparatus of claim 9 wherein said primary concentrating assembly comprises an elongated parabolic reflector.

19. The apparatus of claim 18 wherein said parabolic reflector is defined by a plurality of substantially parallel elongated reflective surfaces.

20. The radiant energy collecting apparatus of claim 18, wherein said proximate edges of said planar reflectors are substantially parallel to said elongated parabolic reflector.

21. The apparatus of claim 9 wherein said secondary reflectors comprise Fresnel mirrors.

22. A solar energy collecting apparatus comprising:

a primary concentrating assembly, said primary concentrating assembly comprising an elongated parabolic collector having a principal axis and a linear focus, said collector being formed by a plurality of elongated reflective surfaces extending substantially parallel to each other and to said linear focus;

a secondary concentrating assembly for receiving energy concentrated by said primary concentrating assembly, said secondary concentrating assembly including a pair of spaced apart fixed planar reflectors arranged on opposite sides of said principal axis, said reflectors lying in substantially parallel planes and facing each other and being substantially parallel to a plane containing said principal axis, edges of said reflectors located proximate said primary concentrating assembly being arranged adjacent said linear focus of said primary concentrating assembly, said edges being substantially linear and extending substantially parallel to each other and to said linear focus, and parabolic secondary reflectors located between said planar reflectors, said parabolic reflectors having individual focus lines and being mounted for rotational movement about their said individual focus lines relative to said plane reflectors.

23. The solar collecting assembly of claim 22 wherein solar energy receiving means are arranged at each said individual said focus line of said secondary reflectors to receive solar energy concentrated by said secondary reflectors.

24. The solar collecting assembly of claim 23 wherein said solar energy receiving means contain an energy absorbent fluid.

\* \* \* \* \*